(12) United States Patent
Miller et al.

(10) Patent No.: US 10,086,781 B2
(45) Date of Patent: Oct. 2, 2018

(54) PUSH THROUGH GROMMET

(71) Applicant: GM GLOBAL TECHNOLOGY OPERATIONS LLC, Detroit, MI (US)

(72) Inventors: Jason M. Miller, St. Clair Shores, MI (US); Hugh S. Bauer, Macomb Township, MI (US); Andrew G. Fox, Milford, MI (US); James N. Nelsen, Howell, MI (US)

(73) Assignee: GM GLOBAL TECHNOLOGY OPERATONS LLC, Detroit, MI (US)

( * ) Notice: Subject to any disclaimer, the term of this patent is extended or adjusted under 35 U.S.C. 154(b) by 0 days.

(21) Appl. No.: 15/347,036

(22) Filed: Nov. 9, 2016

(65) Prior Publication Data
US 2018/0126929 A1    May 10, 2018

(51) Int. Cl.
*B60R 16/02*    (2006.01)
*H01R 13/52*    (2006.01)

(52) U.S. Cl.
CPC ..... *B60R 16/0222* (2013.01); *H01R 13/5205* (2013.01); *H01R 2201/26* (2013.01); *Y10T 16/05* (2015.01)

(58) Field of Classification Search
CPC ............ B60R 16/0222; H01R 13/5205; H01R 2201/26; Y10T 16/05; Y10T 16/063; Y10T 16/088; H02G 3/22

USPC ..... 16/2.1, 2.2, 2.5; 174/152 G, 153 G, 650; 439/271, 274, 275
See application file for complete search history.

(56) References Cited

U.S. PATENT DOCUMENTS

| | | | | |
|---|---|---|---|---|
| 4,685,173 A * | 8/1987 | Pavur | ................. | B60R 16/0222 16/2.2 |
| 6,442,794 B2 * | 9/2002 | Uchida | ............... | B60R 16/0222 16/2.1 |
| 6,489,559 B2 * | 12/2002 | Nakata | ................ | B60R 16/0222 16/2.2 |
| 6,675,439 B2 * | 1/2004 | Hashimoto | ......... | B60R 16/0222 16/2.1 |
| 8,461,457 B2 * | 6/2013 | Miyakoshi | ............... | H02G 3/22 16/2.2 |
| 9,365,171 B2 * | 6/2016 | Shitamichi | ............... | H02G 3/22 |
| 2015/0263495 A1 * | 9/2015 | Suenaga | ............. | B60R 16/0222 174/72 A |

* cited by examiner

*Primary Examiner* — William L Miller

(57) ABSTRACT

Embodiments of a grommet are disclosed herein. In some embodiments, the grommet includes a grommet body having a main body portion, a flange, and an installation extension, an outer surface of the flange at least partially defining a recess, the installation extension connected to the main body portion within the recess and extending at least partially out of the recess, the grommet body having a passage passing therethrough.

11 Claims, 2 Drawing Sheets

PUSH THROUGH GROMMET

INTRODUCTION

The present invention relates to a grommet generally, and specifically to an ergonomic push through grommet.

In the automotive industry, wire bundles, shafts, cables, or tubing are often passed through apertures in a bulkhead panel of a vehicle as it is being built. A grommet is desirable to protect the bundle, cabling, or tubing from the sharp edges of the aperture. The grommets are typically installed by pulling the grommet through the aperture. To pull on the grommet, the installer often extends a reach motion into a space, which can be an awkward and non-ergonomic movement.

SUMMARY

Embodiments according to the present disclosure provide a number of advantages. For example, embodiments according to the present disclosure enable an installer to install a grommet, such as, for example and without limitation, a cable grommet, through the firewall of an engine compartment without having to reach into the engine compartment in an awkward and uncomfortable movement. Additionally, the push through grommet disclosed herein reduces the reach or extension needed to install the grommet, allowing for greater ease of installation. The embodiments discussed below may be used for any type of pass through opening in a vehicle.

In one aspect, a grommet includes a grommet body having a main body portion, a flange, and an installation extension, an outer surface of the flange at least partially defining a recess, the installation extension connected to the main body portion within the recess and extending at least partially out of the recess, the grommet body having a passage passing therethrough.

In some aspects, the installation extension is cylindrical. In some aspects, the installation extension includes one or more projections extending from an exterior surface of the installation extension. In some aspects, the flange includes an outer surface, an underside surface, a recess surface, and a base and the main body portion extends from the base to a first extension.

In some aspects, the main body portion is frustoconical having a wide end and a narrow end and the wide end of the main body portion meets the base at an edge. In some aspects, the first extension is cylindrical and extends from the narrow end of the main body portion. In some aspects, the passage is generally coaxial with the main body portion.

In another aspect, a push through grommet includes a main body portion; a flange extending outwards from the main body portion; a first extension extending in a first direction from the main body portion; and a second extension extending in a second direction from the main body portion; wherein at least a portion of the second extension extends from a recess.

In some aspects, the main body portion is frustoconical having a wide end and a narrow end and the wide end of the main body portion meets the base at an edge. In some aspects, each of the first extension and the second extension is cylindrical and the first extension extends from the narrow end of the main body portion.

In some aspects, the recess is defined by a flange recess surface and a recessed portion of the second extension. In some aspects, the grommet includes a passage running therethrough. In some aspects, the main body has a first width at a recessed end of the recess and a second width smaller than the first width at a point longitudinally separated from the first width in the second direction from the recessed end.

BRIEF DESCRIPTION OF THE DRAWINGS

The present disclosure will be described in conjunction with the following figures, wherein like numerals denote like elements.

Figure 1:
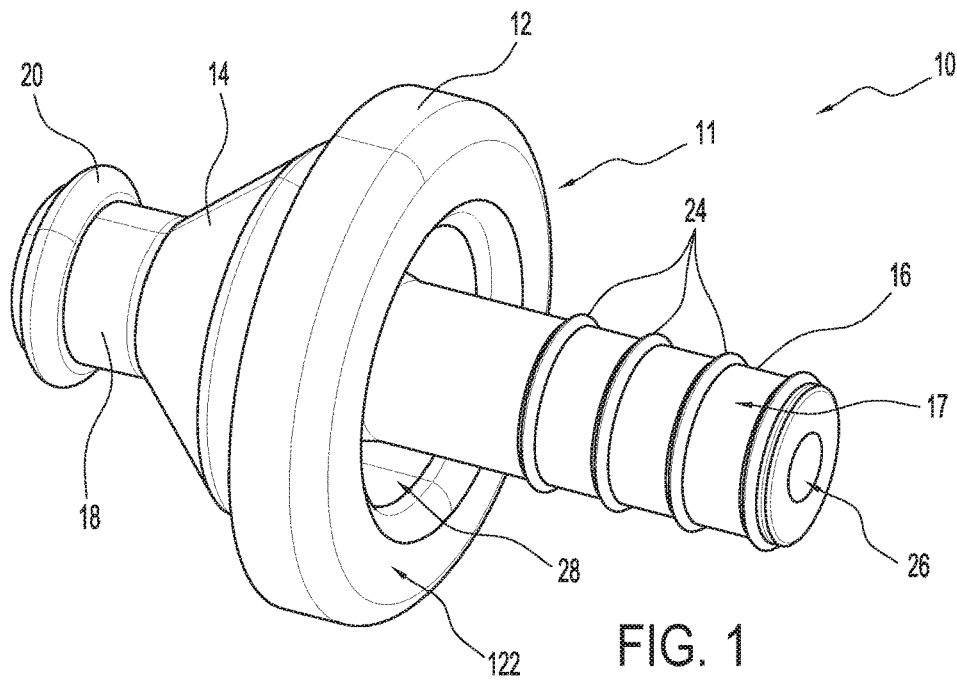
FIG. 1 is a perspective view of a grommet according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 2:
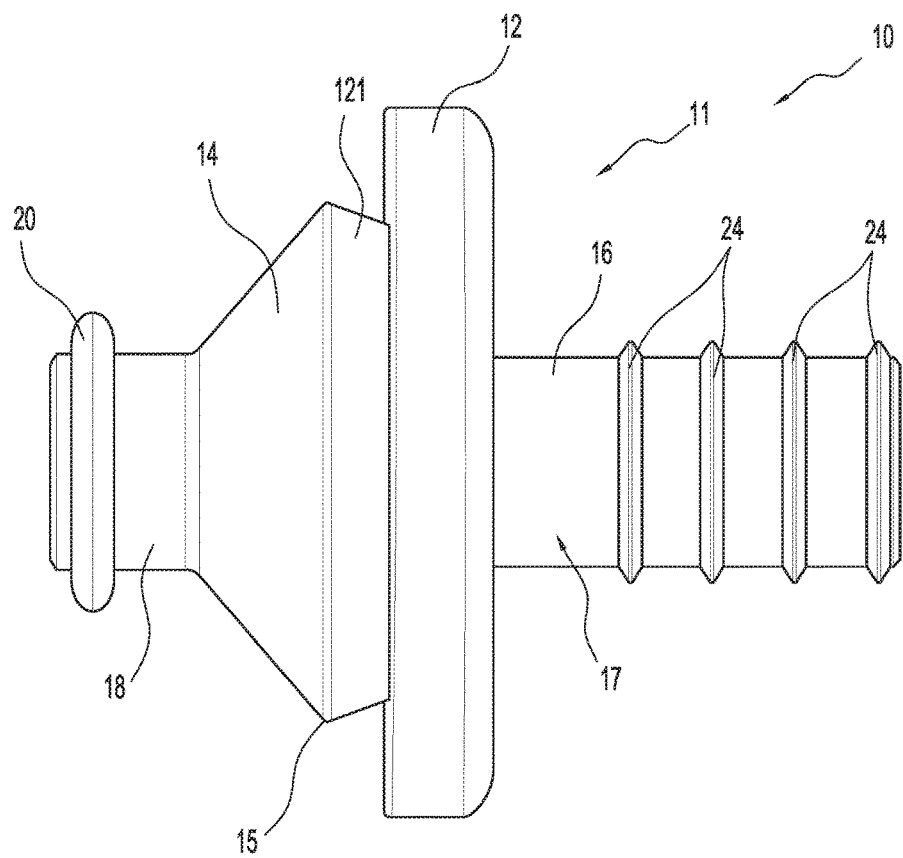
FIG. 2 is a side view of the grommet of FIG. 1.
Figure 3:
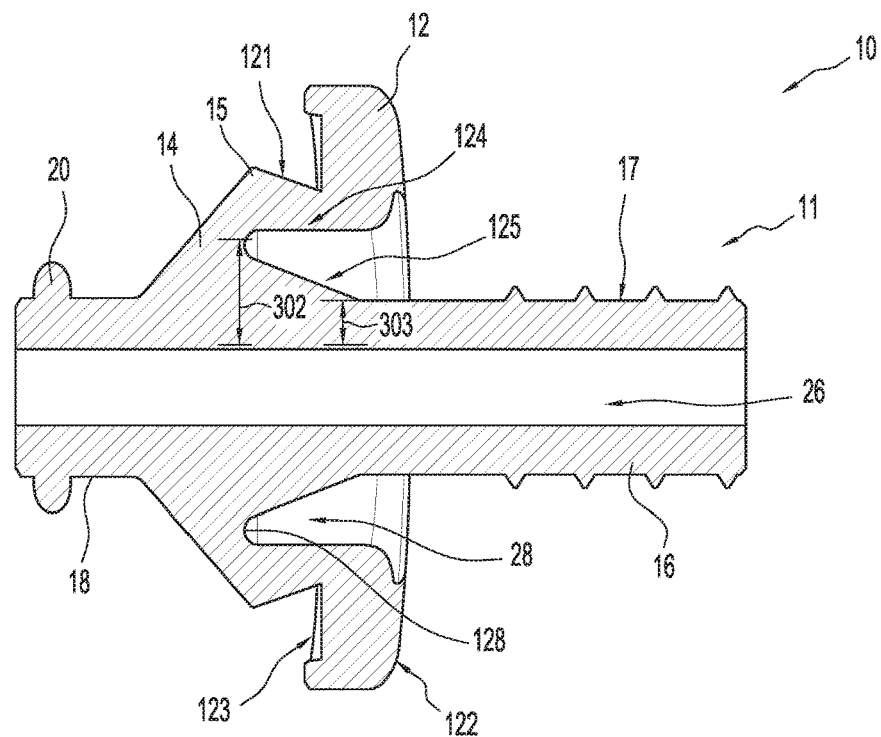
FIG. 3 is a side cross-sectional view of the grommet of FIG. 1.
Figure 4:
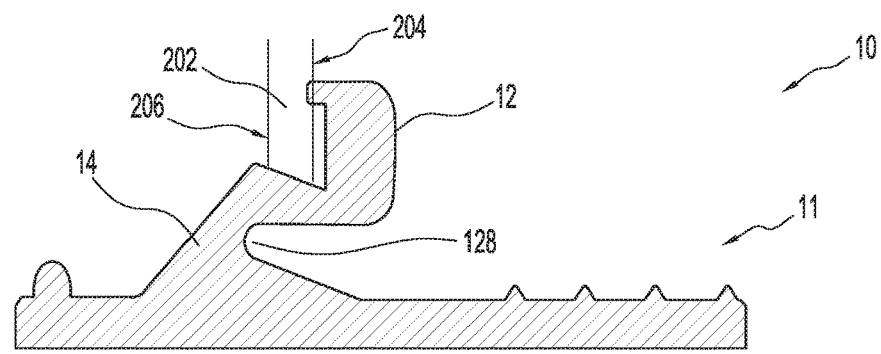
FIG. 4 is a side cross-sectional view of the grommet of FIG. 1 installed in an aperture.
Figure 4:
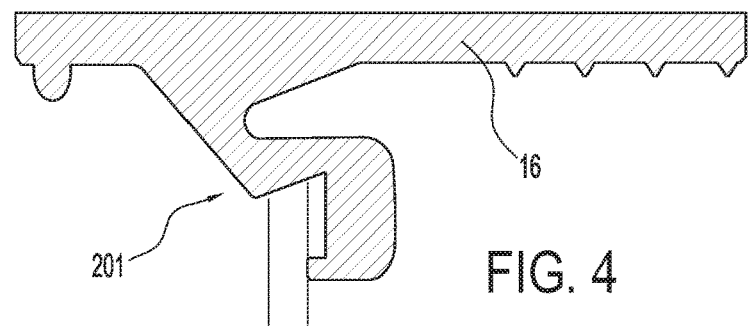

FIGS. 1-4 illustrate a push through grommet 10 according to an embodiment. FIGS. 1-3 illustrate perspective, side, and side cross-sectional views of the grommet 10. FIG. 4 illustrates the grommet 10 installed in an aperture, such as an aperture in a vehicle firewall.

The grommet 10 includes a grommet body designated generally at 11. In some embodiments, the grommet body 11 is molded of a suitable flexible, resilient material such as, for example and without limitation, rubber or plastic, with a circular stop flange 12 joined to a main body portion 14 having a wide end and a narrow end. In some embodiments, the main body portion 14 has a frustoconical shape. The main body portion 14 includes an angled base 121 that joins with a flange underside surface 123 of the stop flange 12. The stop flange includes a grommet flange surface 122 and a flange recess surface 124. In some embodiments, the flange recess surface 124 is a portion of the grommet flange surface 122. The grommet flange surface 122 is an exterior surface of the stop flange 12. When installed, the grommet flange surface 122 is not adjacent to the wall or other surface defining an aperture through which the grommet 10 extends (see FIG. 4). The flange underside surface 123 is adjacent to the wall or other surface defining the aperture through which the grommet 10 extends (see FIG. 4).

The wide end of the main body portion 14 meets the base 121 at an edge 15. The main body portion 14 has an outer diameter smaller than the diameter of the stop flange 12. The outer diameter of the main body portion 14 is everywhere larger than the diameter of an aperture through which the grommet 10 is inserted.

A first extension 18 extends from the narrow end of the main body portion 14. In some embodiments, the first extension 18 has a cylindrical shape. The first extension 18 has an outer diameter smaller than the diameter of the aperture through which the grommet 10 is inserted. A lip 20 extends from an outer surface of the first extension 18. The lip 20 has a diameter wider than the diameter of the aperture through which the grommet 10 is inserted to prevent the grommet 10 from falling out of the aperture during insertion.

A second or cylindrical installation extension 16 extends from an end of a recess 28 of the main body portion 14. The installation extension 16 includes a longitudinally extending outer surface 17 and an angled recessed surface or portion 125. The flange recess surface 124 of the stop flange 12 and the recessed portion 125 of the installation extension 16 meet at a recessed end 128 and define the recess 28. The recessed portion 125 is angled such that a radial dimension 302 of the grommet body 11 at the end 128 is larger than a radial dimension 303 of the grommet body 11 located at the intersection between the recessed portion 125 and the longitudinally-extending exterior surface 17 of the installation extension 16. The installation extension 16 extends past the grommet flange surface 122 of the stop flange 12. In some embodiments, one or more projections 24 extend from the outer surface 17 of the installation extension 16. The one or more projections 24 allow the installation extension 16 to be more easily gripped by an installer during the installation process. In some embodiments, the one or more projections 24 are threads that partially or fully encircle the cylindrical installation extension 16.

A central passage 26 passes through the grommet body 11. The central passage 26 is generally coaxial with the installation extension 16, the main body portion 14, and the first extension 18. In some embodiments, a wire bundle extends through the central passage 26. In some embodiments, other cylindrical components such as a tube, shaft, fastener, hose, or cable, extend through the central passage 26.

FIG. 4 illustrates the grommet 10 installed within an aperture 201. The aperture 201 is defined by the wall 202. The wall 202 includes a first surface 204 and a second surface 206. Depending on the desired placement of the grommet 10, the first surface 204 is an outer surface and the second surface 206 is an inner surface or vice versa.

During insertion, the installer grips the grommet 10 at the installation extension 16. The threads 24 provide a ridged surface for the installer to grip. As the installer pushes the grommet 10 into the aperture 201 (that is, force is applied from the right in FIG. 4 towards the left and the grommet 10 translates through the aperture 201 from the right to the left), initially the lip 20 of the first extension 18 passes through the aperture 201. As more of the grommet body 11 passes through the aperture 201, that is, as the main body portion 14 passes through the aperture 201, the increasing diameter of the main body portion 14 of the grommet body 11 resists further right to left translation or insertion into the aperture 201.

As the main body portion 14 passes through the aperture 201, the larger diameter of the main body portion 14 near the edge 15 requires a higher applied force to push the grommet 10 through the aperture 201. Because the installation extension 16 connects to the grommet body 11 within the recess 28, the applied force is concentrated at the recessed end 128. As the applied force is concentrated at a point near the middle of the grommet 10, the main body portion 14 of the grommet body 11 is put into tension and is pulled through the aperture 201. In other words, the main body portion 14 is placed into tension due to the pushing force applied to the installation extension 16. Applying the pushing force at the recessed end 128 of the grommet body 11 stretches the main body portion 14 away from the stop flange 12. The tension elongates the grommet body 11 and allows the grommet 10 to be pushed into the aperture until the stop flange 12 engages or seats against the wall 204 surrounding the aperture 201.

In contrast to a typical pull through grommet, the grommet body 11 is not placed into compression or compressed as the grommet is inserted into the aperture 201. This allows the grommet 10 to slide or pop more easily into place. When compressed, the typical pull through grommet "bunches up" at the aperture, making it more difficult to pull the grommet through the aperture and seat the grommet in position.

Pushing on the installation extension 16 of the grommet 10 concentrates the force and allows for a steep draft in the grommet 10, providing sensory cues such as auditory and/or tactile feedback to the installer as a cue that the grommet 10 is seated or engaged in the aperture 201. Additionally, the steep draft on the grommet 10 allows for a strong retaining force to maintain the grommet 10 in position in the aperture 201 and allows the installer to push the grommet 10 into place within the aperture 201 with less force than the force used to install traditional pull through grommets.

In contrast to a pull through grommet, which can expand around the stop flange during installation, the grommet 10 elongates during installation. The elongation of the grommet 10 allows for easier installation. Additionally, a push through grommet such as the grommet 10 is easier to install in automotive applications as the grommet 10 can be pushed through the aperture without requiring the installer to get in an uncomfortable or awkward position. For example, and without limitation, the push through grommet 10 allows the installer to apply a pushing force to seat the grommet without having to lean over and in an engine compartment to pull a grommet through the aperture.

As discussed above, in some embodiments, the grommet 10 is manufactured from a resilient material such as a plastic or rubber. In some embodiments, the grommet 10 is molded as a single piece, including the installation extension 16, and replacing the need for additional installation tools.

The grommet 10 may be used for any type of pass through opening in a vehicle. The grommet 10 may be used for other, non-automotive applications in which a cable, hose, tube, shaft, or fastener is passed through an aperture.

It should be emphasized that many variations and modifications may be made to the herein-described embodiments the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A grommet extending from a terminating first end to an opposing terminating second end, comprising a grommet body having a main body portion, a flange, and an installation extension, an outer surface of the flange at least partially defining a recess, the installation extension connected to the main body portion within the recess and extending at least partially out of the recess, the grommet body having a passage passing therethrough, wherein the passage has a continuous width from the first end to the second end and the installation extension includes a plurality of projections extending from an exterior surface of the installation extension to form a gripping surface.

2. The grommet of claim 1, wherein the installation extension is cylindrical.

3. The grommet of claim 1, wherein the flange includes an outer surface, an underside surface, a recess surface, and a base and the main body portion extends from the base to a first extension.

4. The grommet of claim 3, wherein the main body portion is frustoconical having a wide end and a narrow end and the wide end of the main body portion meets the base at an edge.

5. The grommet of claim 4, wherein the first extension is cylindrical and extends from the narrow end of the main body portion.

6. The grommet of claim 1, wherein the passage is generally coaxial with the main body portion.

7. A push through grommet extending from a terminating first end to an opposing terminating second end, comprising:
   a main body portion;
   a flange extending outwards from the main body portion;
   a first extension extending in a first direction from the main body portion and terminating at the first end of the push through grommet;
   a second extension extending in a second direction from the main body portion and terminating at the second end of the push through grommet; and
   a passage extending through the first extension, the main body portion, and the second extension;
   wherein at least a portion of the second extension extends from a recess and a width of the passage is continuous through the first extension, the main body portion, and the second extension.

8. The grommet of claim 7, wherein the flange includes an outer surface, an underside surface, a recess surface, and a base, and the main body portion is frustoconical having a wide end and a narrow end and the wide end of the main body portion meets the base at an edge.

9. The grommet of claim 8, wherein each of the first extension and the second extension is cylindrical and the first extension extends from the narrow end of the main body portion.

10. The grommet of claim 7, wherein the recess is defined by a flange recess surface and a recessed portion of the second extension.

11. The grommet of claim 7, wherein the main body has a first width at a recessed end of the recess and a second width smaller than the first width at a point longitudinally separated from the first width in the second direction from the recessed end.

* * * * *